(12) United States Patent
Cai

(10) Patent No.: US 11,421,643 B1
(45) Date of Patent: Aug. 23, 2022

(54) REVOLVING SPEED VARIABLE VOLTAGE POWER SUPPLY FOR GLOW PLUG OF TWO-STROKE OR FOUR-STROKE GASOLINE ENGINE

(71) Applicant: Mengyuan Cai, Zhejiang (CN)

(72) Inventor: Mengyuan Cai, Zhejiang (CN)

( * ) Notice: Subject to any disclaimer, the term of this patent is extended or adjusted under 35 U.S.C. 154(b) by 0 days.

(21) Appl. No.: 17/326,556

(22) Filed: May 21, 2021

(30) Foreign Application Priority Data

Mar. 22, 2021 (CN) .......................... 202110300927.7

(51) Int. Cl.
*F02P 19/02* (2006.01)
*F02P 9/00* (2006.01)
*H02M 7/04* (2006.01)
*F02B 75/02* (2006.01)
*F02B 75/34* (2006.01)

(52) U.S. Cl.
CPC .............. *F02P 9/002* (2013.01); *F02B 75/02* (2013.01); *F02B 75/34* (2013.01); *F02P 19/021* (2013.01); *F02P 19/022* (2013.01); *F02P 19/026* (2013.01); *H02M 7/04* (2013.01); *F02B 2075/025* (2013.01); *F02B 2075/027* (2013.01); *F02D 2200/101* (2013.01)

(58) Field of Classification Search
CPC ........ F02P 19/02–028; F02D 2200/101; F02B 75/02; F02B 75/34; F02B 2075/025; F02B 2075/027
See application file for complete search history.

(56) References Cited

U.S. PATENT DOCUMENTS

| 4,130,853 | A | * | 12/1978 | Baker | ................ | G05D 23/2401 |
| | | | | | | 361/264 |
| 4,162,669 | A | * | 7/1979 | Igashira | ................. | F02B 53/12 |
| | | | | | | 123/211 |
| 4,478,181 | A | * | 10/1984 | Kikuchi | ................ | F02P 19/022 |
| | | | | | | 123/145 A |
| 4,483,284 | A | * | 11/1984 | Andreasson | ....... | G05D 23/2401 |
| | | | | | | 123/145 A |

(Continued)

FOREIGN PATENT DOCUMENTS

| JP | 59110864 A | * | 6/1984 |
| JP | 59110865 A | * | 6/1984 |

(Continued)

*Primary Examiner* — John M Zaleskas

(57) ABSTRACT

The present disclosure provides a revolving speed variable voltage power supply for a glow plug of a two-stroke or four-stroke gasoline engine, including: an adjust device configured for outputting different control commands according to different revolving speeds of the two-stroke or four-stroke gasoline engine; a switch device connected to the adjust device, and configured for controlling an ON/OFF of a circuit according to the different control commands; a rectify device connected to the adjust device and the switch device, and configured to provide different voltages to the glow plug according to the different control commands and/or the ON/OFF of the switch device. According to the present disclosure, the effects of automatic control of voltage, ignition temperature, etc. can be achieved, the power consumption of the battery carried by the model can be effectively reduced, and the battery life and use stability can be increased.

7 Claims, 2 Drawing Sheets

(56) References Cited

U.S. PATENT DOCUMENTS

| | | | | |
|---|---|---|---|---|
| 4,511,792 A * | 4/1985 | Kawamura | ............ | F02P 19/021 219/202 |
| 4,706,151 A * | 11/1987 | Roberts | ............ | F02P 19/02 361/2 |
| 4,742,805 A * | 5/1988 | Matsushita | ............ | F02B 19/165 123/270 |
| 4,821,690 A * | 4/1989 | Masaki | ............ | F02P 19/02 123/145 R |
| 4,939,347 A * | 7/1990 | Masaka | ............ | F02P 19/022 219/205 |
| 4,947,808 A * | 8/1990 | Kawamura | ............ | F02P 19/026 123/145 A |
| 5,012,781 A * | 5/1991 | Yokoyama | ............ | F02M 21/0233 123/527 |
| 5,367,994 A * | 11/1994 | Hinkle | ............ | F02P 19/026 123/179.21 |
| 2002/0033155 A1* | 3/2002 | Jung | ............ | F02D 41/062 123/145 A |
| 2002/0036192 A1* | 3/2002 | Sato | ............ | F02P 17/12 219/270 |
| 2003/0010306 A1* | 1/2003 | Nishimoto | ............ | F02P 19/026 123/145 A |
| 2004/0025829 A1* | 2/2004 | Wuerfel | ............ | F02B 17/00 123/295 |
| 2006/0289425 A1* | 12/2006 | Serra | ............ | F02P 19/025 219/270 |
| 2007/0240663 A1* | 10/2007 | Hiramatsu | ............ | F02P 19/02 123/145 A |
| 2007/0289572 A1* | 12/2007 | Petridis | ............ | F02D 35/025 123/145 A |
| 2008/0163840 A1* | 7/2008 | Toedter | ............ | F02P 19/026 123/179.21 |
| 2008/0210186 A1* | 9/2008 | Stoller | ............ | F02P 19/022 123/145 A |
| 2009/0012695 A1* | 1/2009 | Kernwein | ............ | F02P 19/026 123/145 A |
| 2009/0194070 A1* | 8/2009 | Dittus | ............ | F02P 19/025 123/406.55 |
| 2009/0271098 A1* | 10/2009 | Hosaka | ............ | F02P 19/023 701/113 |
| 2009/0289051 A1* | 11/2009 | Cassani | ............ | F02P 19/025 123/145 A |
| 2010/0280735 A1* | 11/2010 | Moritz | ............ | F02P 19/026 701/102 |
| 2011/0041818 A1* | 2/2011 | Kernwein | ............ | F02P 19/022 123/623 |
| 2011/0108540 A1* | 5/2011 | Kernwein | ............ | F02P 19/022 219/268 |
| 2011/0118952 A1* | 5/2011 | Fink | ............ | F02P 19/026 60/273 |
| 2011/0118964 A1* | 5/2011 | Tanaka | ............ | F02P 19/026 701/113 |
| 2011/0220073 A1* | 9/2011 | Sackmann | ............ | F02P 19/025 123/623 |
| 2011/0251774 A1* | 10/2011 | Cassani | ............ | F02P 19/023 701/102 |
| 2011/0303650 A1* | 12/2011 | Sakurai | ............ | F02P 19/025 219/263 |
| 2013/0087129 A1* | 4/2013 | Kurtz | ............ | F02P 19/02 123/676 |
| 2014/0102396 A1* | 4/2014 | Nakamura | ............ | F02P 19/02 123/179.21 |
| 2014/0216384 A1* | 8/2014 | Tanaka | ............ | F02P 19/026 324/705 |
| 2014/0236460 A1* | 8/2014 | Neely | ............ | F02P 19/028 701/113 |
| 2015/0053178 A1* | 2/2015 | Estefanous | ............ | F02P 9/002 123/406.12 |
| 2015/0059680 A1* | 3/2015 | Yoshida | ............ | F02P 5/1502 123/179.21 |
| 2015/0330354 A1* | 11/2015 | Choi | ............ | H01T 13/04 |
| 2016/0305394 A1* | 10/2016 | Demmons | ............ | F02P 19/023 |
| 2016/0308303 A1* | 10/2016 | Demmons | ............ | H01T 13/04 |

FOREIGN PATENT DOCUMENTS

| | | | |
|---|---|---|---|
| JP | 61046470 A | * | 3/1986 |
| JP | 01211666 A | * | 8/1989 |
| JP | 2009167817 A | * | 7/2009 |

* cited by examiner

REVOLVING SPEED VARIABLE VOLTAGE POWER SUPPLY FOR GLOW PLUG OF TWO-STROKE OR FOUR-STROKE GASOLINE ENGINE

CROSS REFERENCE TO RELATED APPLICATIONS

The present application claims the benefit of Chinese Patent Application No. 202110300927.7 filed on Mar. 22, 2021, the contents of which are incorporated herein by reference in their entirety.

TECHNICAL FIELD

The present disclosure relates to the technical field of aircraft models and other models, and specifically, refers to a revolving speed variable voltage power supply and system for a glow plug of a two-stroke or four-stroke gasoline engine.

BACKGROUND

The two-stroke model gasoline engine and the four-stroke model gasoline engine are dedicated engines that provide sufficient power for large and medium-sized aircraft models, ship models, and other models. The piston moves in the cylinder to do work to provide power to the crankshaft, then, in turn, drives the propeller shaft and propeller to rotate, to generate forward power and drive the aircraft model or ship model to operate; or drive the propeller shaft and transmission system to make the car model tires rotate, to provide power and drive the car model to operate. The oil-gas mixture sucked into the cylinder through the carburetor is compressed by the piston, and the temperature and pressure increase. After being ignited, it burns rapidly and expands in volume, and the piston is pressed down to complete a stroke. Among them, the most commonly used ignite device inserted into the cylinder on the market is a 6-12V spark plug, which ignites the fuel mixture by generating a high-temperature instantaneous arc. There is also a technology that uses a glow plug with an electric heating wire inserted into the cylinder. After the electric heating wire is energized, the heating wire generates a high temperature much higher than the ignition point of the fuel-air mixture to ignite the fuel-air mixture, to achieve a similar effect of using a spark plug. The model or aircraft model will carry a power supply battery, after a certain step-down and steady current, it will provide electric energy for the glow plug to generate heat.

The current use of the glow plug as a two-stroke and four-stroke model gasoline engine device has the following shortcomings: the voltage supplied to the glow plug is constant, that is, the voltage supplied to the glow plug remains constant from the start of the engine operation until the power supply of the glow plug is turned off, the voltage supplied to the glow plug remains constant always, such that the heating wire of the glow plug also maintains a constant high temperature during this time to ignite the fuel-air mixture. However, in reality, when the engine is running at high speed, the cylinder itself has a high temperature, coupled with the high temperature generated by the compressed fuel-air mixture, the heat energy provided by both greatly reduces the energy required for ignition. In this case, the constant voltage provided to the glow plug will greatly reduce the battery life of the power supply, and accelerate the loss rate of the glow plug, such that not only a lot of energy can be consumed, but also the battery life of the model is limited, and the service life of the device is greatly shortened, with low stability.

SUMMARY

Given this, an object of the present disclosure is to provide a revolving speed variable voltage power supply and a system thereof for a glow plug of a two-stroke and four-stroke gasoline engine, to solve at least one of the above-mentioned problems.

Based on the above objective, according to the first aspect of the present disclosure, it is provided a revolving speed variable voltage power supply for a glow plug of a two-stroke or four-stroke gasoline engine, comprising:

an adjust device configured for outputting different control commands according to different revolving speeds of the two-stroke or four-stroke gasoline engine;

a switch device connected to the adjust device, and configured for controlling an ON/OFF of a circuit according to the different control commands;

a rectify device connected to the adjust device and the switch device, and configured to provide different voltages to the glow plug according to the different control commands and/or an ON/OFF of the switch device.

Optionally, the adjust device comprises:

a speed acquisition unit configured for collecting the revolving speeds of the two-stroke or four-stroke gasoline engine;

a control unit connected to the speed acquisition unit, and configured to output the control demands according to the revolving speeds.

Optionally, the control unit is further configured for that:

when the revolving speed falls within a first revolving speed range, the control unit outputs a first control demand to the switch device to control the switch device to be turned on;

when the revolving speed falls within a second revolving speed range, the control unit outputs a second control demand to the switch device to control the switch device to be turned off;

when the revolving speed falls within a third revolving speed range, the control unit outputs a third control demand to the rectify device to control the rectify device not to output voltage.

Optionally, the rectify device is further configured for that:

when the control unit outputs the first control demand, the switch device is turned on, and the rectify device outputs the first voltage;

when the control unit outputs the second control demand, the switch device is turned off, and the rectify device outputs a second voltage, the second voltage is less than the first voltage;

when the control unit outputs the third control demand, the rectify device fails to output voltage.

Optionally, the first revolving speed range is less than or equal to 3000 revolutions per minute (r/m); the second revolving speed range is greater than 3000 revolutions per minute and less than or equal to 3800 revolutions per minute; and the third speed range is more than 3800 revolutions per minute.

Optionally, the first voltage range comprises greater than 1.3V and less than or equal to 1.8V; the second voltage range comprises greater than 0.8V and less than or equal to 1.3 V.

Optionally, the adjust device comprises: a first output terminal connected to a control terminal of the switch device; and a second output terminal connected to an enable terminal of the rectify device;

wherein, when the revolving speed falls within the first revolving speed range or in the second revolving speed range, the first output terminal outputs the first control command or the second control command to the control terminal of the switch device, and the second output terminal outputs an enable signal to the enable terminal of the rectify device;

when the revolving speed falls within the third revolving speed range, the first output terminal fails to output, and the second output terminal outputs the third control command to an enable terminal of the switch device, such that the rectify device fails to work.

Optionally, the adjust device is implemented based on an MCU, and the rectify device is implemented based on a rectifier chip.

According to the second aspect of the present disclosure, it is provided a two-stroke or four-stroke gasoline engine system, comprising:

a two-stroke gasoline engine configured to power a model; a four-stroke gasoline engine configured to power a model;

a revolving speed variable voltage power supply for a glow plug of a two-stroke or four-stroke gasoline engine according to the first aspect.

It can be seen from the above that the revolving speed variable voltage power supply for a glow plug of a two-stroke and four-stroke gasoline engines and a system thereof provided in the present disclosure can provide different voltages to the glow plug through different engine speeds, such that the effects of voltage, ignition temperature, etc. can be automatically controlled, and the power consumption of the battery carried by the model and aircraft model can be effectively reduced, and the battery life and use stability can be increased.

BRIEF DESCRIPTION OF DRAWINGS

To more clearly describe the technical solutions in the present disclosure or related technologies, the following will briefly introduce the accompanying drawings that need to be used in the embodiments or related technical descriptions. Obviously, the drawings in the following description are merely the embodiments of the present disclosure, for those of ordinary skill in the art, other drawings can be obtained based on these drawings without any inventive work.

DESCRIPTION OF EMBODIMENTS

Figure 1:
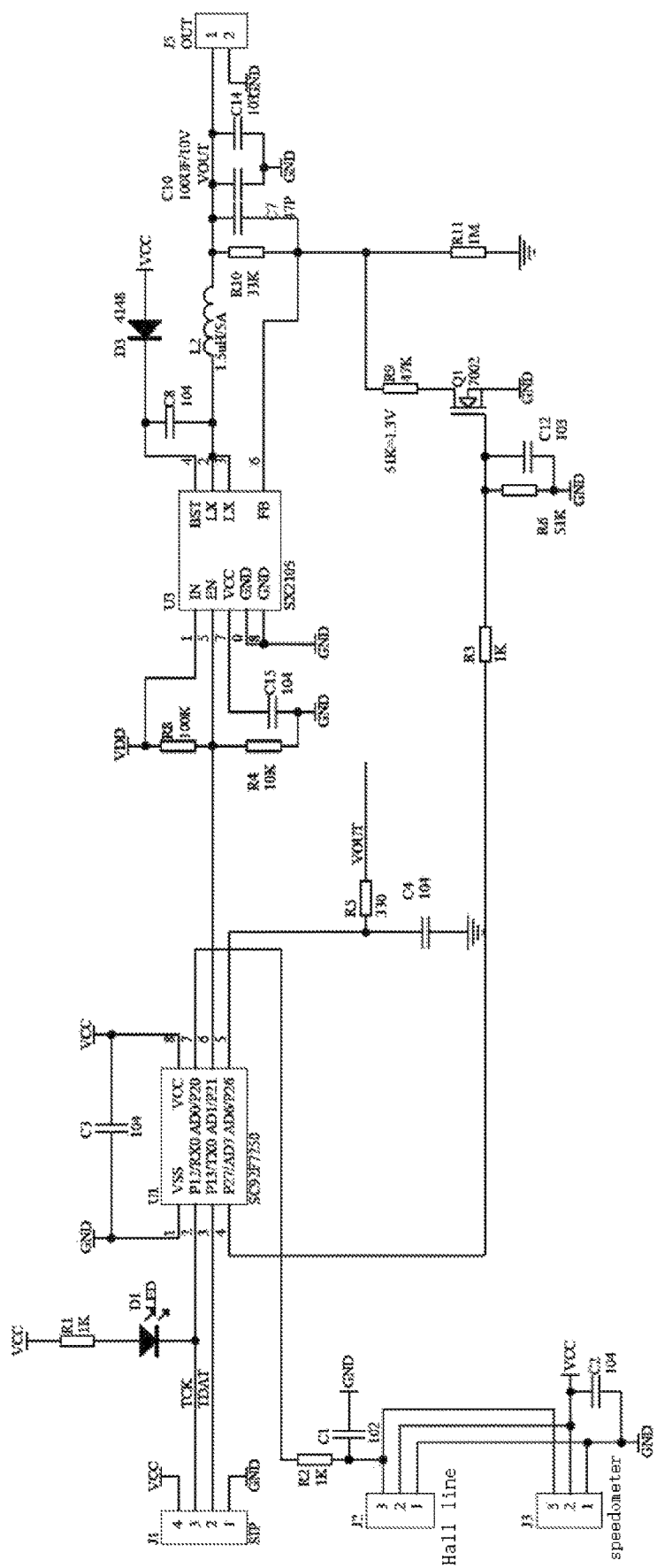
FIG. 1 is an example illustrating a revolving speed variable voltage power supply for a glow plug of a two-stroke or four-stroke gasoline engine according to an embodiment of the present disclosure.

In order to make the objectives, technical solutions, and advantages of the present disclosure clearer, the present disclosure will be further described in detail below in combination with specific embodiments and concerning the accompanying drawings.

It should be noted that, unless otherwise defined, the technical terms or scientific terms used in the embodiments of the present disclosure should be the ordinary meanings understood by those with ordinary skills in the field to which the disclosure belongs. The "first", "second" and similar words used in the embodiments of the present disclosure do not indicate any order, quantity, or importance, but are only used to distinguish different components. "comprise" or "include" and other similar words mean that the element or item appearing before the word includes the element or item listed after the word and their equivalents, but does not exclude other elements or items. Similar words such as "connect" or "interconnect" are not limited to physical or mechanical connections, but may include electrical connections, whether direct or indirect.

Given the shortcomings of the prior art, the embodiments of the present disclosure provide a revolving speed variable voltage power supply for a glow plug of a two-stroke or four-stroke gasoline engine, such that the effects of automatic control of voltage, ignition temperature, etc. can be realized, the power consumption of the battery carried by the model and aircraft model can be effectively reduced, and the battery life and use stability can be increased.

According to the present disclosure, a revolving speed variable voltage power supply for a glow plug of a two-stroke or four-stroke gasoline engine may include:

an adjust device configured for outputting different control commands according to different revolving speeds of the two-stroke or four-stroke gasoline engine;

a switch device connected to the adjust device, and configured for controlling an ON/OFF of a circuit according to the different control commands;

a rectify device connected to the adjust device and the switch device, and configured to provide different voltages to the glow plug according to the different control commands and/or an ON/OFF of the switch device.

Optionally, the adjust device may include:

a speed acquisition unit configured for collecting the revolving speeds of the two-stroke or four-stroke gasoline engine;

a control unit connected to the speed acquisition unit, and configured to output the control demands according to the revolving speeds.

In some embodiments, the control unit may be implemented based on an MCU. Further, in some embodiments, the MCU may be an SC92F7250 type MCU.

Optionally, the control unit may be further configured for that:

when the revolving speed falls within a first revolving speed range, the control unit outputs a first control demand to the switch device to control the switch device to be turned on;

when the revolving speed falls within a second revolving speed range, the control unit outputs a second control demand to the switch device to control the switch device to be turned off;

when the revolving speed falls within a third revolving speed range, the control unit outputs a third control demand to the rectify device to control the rectify device not to output voltage.

In some embodiments, the rectify device may be implemented based on a rectifier chip. Further, in some embodiments, the rectifier chip may be an SX2105 step-down synchronous rectifier chip.

Optionally, the rectify device may be further configured for that:

when the control unit outputs the first control demand, the switch device is turned on, and the rectify device outputs the first voltage;

when the control unit outputs the second control demand, the switch device is turned off, and the rectify device outputs a second voltage, the second voltage is less than the first voltage;

when the control unit outputs the third control demand, the rectify device fails to output voltage.

In some embodiments, the first revolving speed range may be less than or equal to 3000 revolutions per minute (r/m or rpm); the second revolving speed range may be greater than 3000 revolutions per minute and less than or equal to 3800 revolutions per minute; and the third speed range may be more than 3800 revolutions per minute.

In some embodiments, the first voltage range may include greater than 1.3V and less than or equal to 1.8V; the second voltage range may include greater than 0.8V and less than or equal to 1.3 V.

Optionally, the adjust device may include: a first output terminal connected to a control terminal of the switch device; and a second output terminal connected to an enable terminal of the rectify device;

wherein, when the revolving speed falls within the first revolving speed range or in the second revolving speed range, the first output terminal may output the first control command or the second control command to the control terminal of the switch device, and the second output terminal may output an enable signal to the enable terminal of the rectify device;

when the revolving speed falls within the third revolving speed range, the first output terminal fails to output, and the second output terminal may output the third control command to an enable terminal of the switch device, such that the rectify device fails to work.

Specifically, in some embodiments, refer to FIG. 1, FIG. 1 shows an example of a revolving speed variable voltage power supply for a glow plug of a two-stroke or four-stroke gasoline engine according to an embodiment of the present disclosure.

Wherein, according to the embodiment of the present disclosure, the revolving speed variable voltage power supply for a glow plug of a two-stroke or four-stroke gasoline engine may include an adjust device, a switch device, and a rectify device. The adjust device may output power to the rectify device, and the output terminal of the rectify device may be connected to the first pin of the power output interface J5, and the second pin of the power output interface J5 may be grounded.

As shown in FIG. 1, the adjust device may also include a package interface J1; and may further include: a speedometer J3 for displaying the revolving speed. The switch device may include a MOS transistor Q1. Among them, the revolving speed acquisition unit may include: a Hall line interface J2, a resistor R2, and a capacitor C1. The adjust device may include an MCU U1.

Specifically, the first pin of the MCU U1 may be connected to the eighth pin of the MCU U1, and the capacitor C3 may be connected in series between the first pin of the MCU U1 and the eighth pin of the MCU U1; the first pin of the MCU U1 may be grounded. The eighth pin of the MCU U1 may be connected to the power supply voltage VCC, the second pin of the MCU U1 may be connected to the third pin of the package interface J1. The third pin of the MCU U1 may be connected to the second pin of the package interface J1, the fourth pin of the MCU U1 may be connected to the gate of the MOS transistor Q1, and the resistor R3 may be connected in series between the fourth pin of the MCU U1 and the gate of the MOS transistor Q1. The gate of the MOS transistor Q1 may be connected to one end of a capacitor C12, the other end of the capacitor C12 may be grounded, both ends of the capacitor C12 may be connected in parallel with a resistor R6. The source of the MOS transistor Q1 may be grounded. The drain of the MOS transistor Q1 may be connected to one end of a resistor R9, the other end of the resistor R9 may be connected to one end of a resistor R11, the other end of the resistor R11 may be grounded, the other end of the resistor R9 may be connected to the rectifier circuit unit. The fifth pin of the MCU U1 may be connected to one end of a capacitor C4, the other end of the capacitor C4 may be grounded. The fifth pin of the single-chip U1 may be connected to one end of a resistor R5, the other end of the resistor R5 may output a voltage. The sixth pin of the MCU U1 may be connected to the rectifier circuit unit, and the seventh pin of the MCU U1 may be respectively connected to the third pin of the Hall line interface J2 and the third interface of the speedometer J3, and a resistor R2 may be connected in series between the seventh pin of the MCU U1 and the third pin of the Hall line interface J2. The third pin of the Hall line interface J2 may be connected to one end of the capacitor C1, the other end of the capacitor C1 may be grounded. The first pin of the package interface J1 may be grounded; the fourth pin of the package interface J1 may be connected to the power supply voltage VCC; the third pin of the package interface J1 may be connected to the cathode of a diode, and the anode of the diode may be connected to one end of a resistor R1, and the other end of the resistor R1 may be connected to the power supply voltage VCC. The second pin of the Hall line interface J2 may be connected to the second pin of the speedometer J3, and the first pin of the Hall line interface J2 may be connected to the first pin of the speedometer J3. The capacitor C2 may be connected in series between the first pin of the speedometer J3 and the second pin of the speedometer J3, the first pin of the speedometer J3 may be grounded, and the second pin of the speedometer J3 may be connected to the power supply voltage VCC.

In the above technical solution, the electrical signal generated by the Hall sensor inducing the rotation of the engine propeller and the propeller shaft may be output by the third pin of the Hall line interface J2, and input by the seventh pin of the MCU U1 after passing through the resistor R2. Among them, MCU U1 may be SC92F7250 MCU that is an enhanced IT 8051 core industrial-grade Flash microcontroller, with pre-written algorithms. The electrical signal input from the seventh pin of the MCU U1 may be calculated by the SC92F7250 MCU through the algorithm to obtain the total amount of the passed electrical signals per unit time, to determine the instantaneous revolving speed of the engine.

It is understandable that when 100 electrical signals are input every 5 seconds, that is, the instantaneous revolving speed may be 1200 rpm. After SC92F7250 MCU calculates the engine speed, it forms two kinds of segmented provision voltage.

Among them, the first pin of the MCU U1 may be VSS, the second pin may be P12/RX0, the third pin may be P13/TX0, the fourth pin may be P27/AD7, the fifth pin may be AD6/P26, and the sixth pin may be AD1/P21, the seventh pin may be AD0/P20, and the eighth pin may be VCC.

Further, the diode D1 may be a light-emitting diode.

Further, the MOS transistor Q1 may be an N-channel MOS transistor.

As shown in FIG. 1, the rectify device may include a rectifier chip U3, a resistor R8, a resistor R4, a capacitor C8, an inductor L2, a diode D3, a resistor R10, a capacitor C7, a capacitor C15, a capacitor C10, and a capacitor C14. The first pin of the rectifier chip U3 and the fifth pin of the rectifier chip U3 may be respectively connected to both ends of the resistor R8. The first pin of the rectifier chip U3 may be connected to the power supply voltage VDD, and the fifth pin of the rectifier chip U3 may be connected to the sixth pin of the MCU U1. The fifth pin of the rectifier chip U3 may be connected to one end of the resistor R4, the other end of the resistor R4 may be grounded and connected to one end of the capacitor C15, and the other end of the capacitor C15 may be connected to the seventh pin of the rectifier chip U3. The fourth pin of the rectifier chip U3 may be connected to the cathode of the diode D3, and the anode of the diode D3 may be connected to the power supply voltage VCC. The fourth pin of the rectifier chip U3 may be connected to one end of the capacitor C8, and the other end of the capacitor C8 may be respectively connected to the second pin and the third pin of the rectifier chip U3. The second pin and the third pin of the rectifier chip may be both connected to one end of the inductor L2, one end of the resistor R10, the capacitor C7, the capacitor C10, and the capacitor C14 may be all connected to the other end of the inductor L2. The other ends of the resistor R10 and the capacitor C7 may be both connected to the sixth pin of the rectifier chip U3. The other end of the capacitor C10 and the capacitor C14 may be connected to each other and grounded. The other end of the inductor L2 may be connected to the first pin of the power output interface J5. The other ends of the resistor R10 and the capacitor C7 may be both connected to one end of the resistor R11.

Among them, the first pin of the rectifier chip U3 may be IN, the second pin may be LX, the third pin may be LX, the fourth pin may be BST, the fifth pin may be EN, the sixth pin may be FB, and the seventh pin may be VCC, the eighth pin may be GND, and the 0th pin may be GND.

Optionally, the revolving speed variable voltage power supply may further include: a power supply device connected to the adjust device and the rectify device and configured to provide power.

Figure 2:
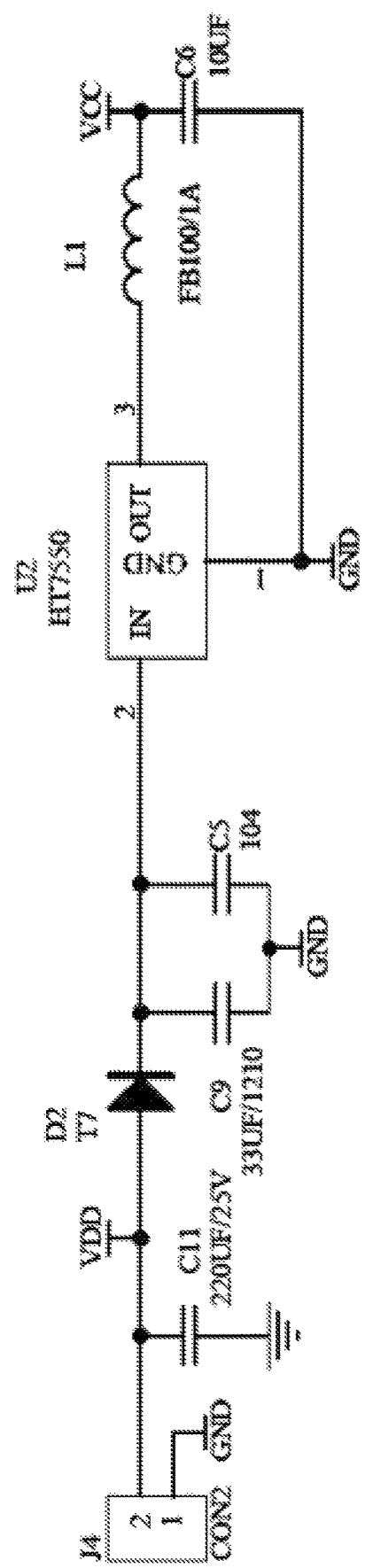
FIG. 2 is an example illustrating a power supply device according to an embodiment of the present disclosure.

In some embodiments, referring to FIG. 2, FIG. 2 shows an example of a power supply device according to an embodiment of the present disclosure. As shown in FIG. 2, the power supply device may include: a power interface J4, a capacitor C11, a diode D2, a capacitor C9, a capacitor C5, a capacitor C6, a voltage stabilizing chip U2, and an inductor L1. The first pin of the power interface J4 may be grounded, the second pin of the power interface J4 may be connected to one end of the capacitor C11, the other end of the capacitor C11 may be grounded. One end of the capacitor C11 may be connected to the anode of the diode D2, and one end of the capacitor C11 may be connected to the power supply voltage VDD, the cathode of the diode D2 may be connected to one end of the capacitor C9 and the capacitor C5 respectively, and the other ends of the capacitor C9 and the capacitor C5 may be connected to each other and grounded. The second pin of the voltage stabilizing chip U2 may be connected to the cathode of the diode D2, the first pin of the voltage stabilizing chip U2 may be grounded, and the third pin of the voltage stabilizing chip U2 may be connected to one end of the inductor L1, and the other end of the inductor L1 may be connected to one end of the capacitor C6 and simultaneously connected to the power supply voltage VCC, the other end of the capacitor C6 may be connected to the first pin of the voltage stabilizing chip U2.

In some embodiments, the voltage stabilizing chip U2 may be HT7550.

In some embodiments, referring to FIG. 1 again, if the SC92F7250 MCU calculates the revolving speed from 0 rpm to 3000 rpm, and it belongs to the low-speed operation state, the fourth pin of the MCU U1 outputs a low-level signal, and the gate of the MOS transistor Q1 may enter and turn on the circuit. After the MOS tube Q1 is fully turned on, the circuit is divided by the resistor R9 and the resistor R10, wherein the resistance value of the resistor R9 is 47K, and the resistance value of the resistor R10 is 33K. The current enters from the FB pin of the rectifier chip U3, at this time, the reference voltage of the FB pin may be 0.8V. When a voltage of 0.8V is input to the FB pin, the SX2105 synchronous rectifier chip of U3 will output a current of 1.6V to the second and third pins through the LX pin. The current passes through the inductance coil with an inductance of 1.5 µH/5A and finally outputs a 1.6V voltage to the J5 OUT output port, which is supplied to the glow plug. At this time, the heating wire of the glow plug receives a voltage of 1.6V, generates heat at full power, and ignites the fuel-air mixture.

If the SC92F7250 MCU calculates the speed to be greater than 3000 rpm and less than 3800 rpm, it belongs to the medium-speed operation state, the fourth pin (P27/AD7) may output a high-level signal, the gate of the MOS transistor at Q1 7002 enters and the MOS transistor may be completely turned off. After the MOS transistor is turned off, the SX2105 step-down synchronous rectifier chip of the input pin of the sixth pin FB will output a current with a voltage of 0.8V to pins 2 and 3 through the LX pin. At this time, the circuit may be in half-power operation. The current flows through the inductance coil with an inductance of 1.5 µH/5A and finally outputs a voltage of 1.2V to the J5 OUT output port, which may be supplied to the glow plug. At this time, the heating wire of the glow plug receives a voltage of 1.2V, generates heat at low power, and ignites the fuel-air mixture.

If the SC92F7250 MCU calculates the speed to be greater than 3800 rpm, it belongs to the full-speed operation state, and the output voltage leading to the output port may be turned off. At this time, the voltage supplied to the glow plug may be 0V. But because the speed is too big, the temperature in the cylinder at this time may be enough to maintain the heating wire of the glow plug at a high temperature, so the glow plug that maintains a high temperature can continue to ignite the fuel-air mixture and maintain the stable operation of the engine.

It can be seen that the voltage supplied to the glow plug may be high when the engine is running at low speed; and when the engine is running at high speed, the voltage that needs to be supplied to the glow plug may be appropriately reduced, and the gas compression in the cylinder and the residual heat of gasoline combustion may be used to reduce the ignition temperature threshold that reaches the ignition point of the fuel-air mixture. Therefore, when the engine is running at full speed, the current passing through the heating wire may be automatically reduced to 0V, such that battery energy consumption can be saved, the battery life of the power supply can be increased, and the service life of the glow plug can be increased without affecting the operation of the engine. Since it does not need to be in a high-voltage power supply state frequently during use as a traditional electronic igniter, the technical solution of the present disclosure can intelligently adjust the power supply voltage according to the engine operating conditions, especially when the engine is running at a high speed, the use frequency of the power supply equipment and electricity consumption can be effectively reduced.

According to an embodiment of the present disclosure, it is also provided a two-stroke or four-stroke gasoline engine system, including:

a two-stroke gasoline engine configured to power the model; a four-stroke gasoline engine configured to power the model;

According to an embodiment of the present disclosure, a revolving speed variable voltage power supply for the glow plug of the two-stroke or four-stroke gasoline engine is provided.

To sum up, according to the embodiments of the present disclosure, the revolving speed variable voltage power supply and system for the glow plug of a two-stroke or four-stroke gasoline engine make the voltage supplied to the glow plug of the engine high when the engine is running at a low speed; and make the voltage that needs to be supplied to the glow plug appropriately reduced when the engine is running at a high speed, so that the gas compression in the cylinder and the residual heat of gasoline combustion can be used to reduce the ignition temperature threshold to reach the ignition point of the fuel-air mixture. In turn, the effects of automatic control of voltage and ignition temperature may be achieved, and the power consumption of the battery carried by the model may be effectively reduced, and the battery life and stability of use may be increased.

It should be noted that some embodiments of the present disclosure have been described above. Other embodiments are within the scope of the appended claims. In some situations, the actions or steps described in the claims can be performed in a different order from the above-mentioned embodiments and still have desired results achieved. In addition, the processes depicted in the drawings do not necessarily require the specific order or sequential order shown in order to achieve the desired results. In some embodiments, multitasking and parallel processing are also possible or may be advantageous.

Those of ordinary skill in the art should understand that the discussion of any of the above embodiments is only exemplary, and is not intended to imply that the scope of the present disclosure (including the claims) is limited to these examples. Under the idea of the present disclosure, the above embodiments or the technical features in different embodiments can also be combined, the steps can be implemented in any order, and there are many other changes in different aspects of the embodiments of the present disclosure as described above, and they are not provided in details for the sake of brevity.

In addition, in order to simplify the description and discussion, and in order not to make the embodiments of the present disclosure difficult to understand, the provided drawings may or may not show the integrated circuit (IC) chip and the well-known power supply/ground connection and other components. In addition, the devices may be shown in the form of block diagrams in order to avoid making the embodiments of the present disclosure difficult to understand, and this also takes into account the fact that the details of the implementation of these block diagram devices are highly dependent on the platform to implement the embodiments of the present disclosure (ie, these details should be fully within the understanding of those skilled in the art). In the case where specific details (for example, circuits) are described to describe exemplary embodiments of the present disclosure, it is obvious to those skilled in the art that it may be possible to implement the embodiments of the present disclosure without these specific details or when these specific details are changed. Therefore, these descriptions should be considered illustrative rather than restrictive.

Although the present disclosure has been described in combination with specific embodiments of the present disclosure, based on the foregoing description, many substitutions, modifications, and variations of these embodiments will be apparent to those of ordinary skill in the art.

The embodiments of the present disclosure are intended to include all such substitutions, modifications, and variations that fall within the broad scope of the appended claims. Therefore, any omissions, modifications, equivalent substitutions, improvements, etc. made within the spirit and principles of the embodiments of the present disclosure should be included in the protection scope of the present disclosure.

What is claimed is:

1. A revolving speed variable voltage power supply for a glow plug of a two-stroke or four-stroke gasoline engine, comprising:
    an adjust device configured for outputting different control commands according to different revolving speeds of the two-stroke or four-stroke gasoline engine;
    a switch device connected to the adjust device, and configured for controlling an on-off of a circuit according to the different control commands; and
    a rectify device connected to the adjust device and the switch device, and configured for providing different voltages to the glow plug according to the different control commands and/or an on-off of the switch device;
    wherein the adjust device comprises:
    a speed acquisition unit configured for collecting the revolving speeds of the two-stroke or four-stroke gasoline engine; and
    a control unit connected to the speed acquisition unit, and configured for outputting the control commands according to the revolving speeds;
    wherein the control unit is further configured for that:
    when the revolving speed falls within a first revolving speed range, the control unit outputs a first control demand to the switch device to control the switch device to be turned on;
    when the revolving speed falls within a second revolving speed range, the control unit outputs a second control demand to the switch device to control the switch device to be turned off; and
    when the revolving speed falls within a third revolving speed range, the control unit outputs a third control demand to the rectify device to control the rectify device not to output voltage; and
    wherein the first revolving speed range is less than or equal to 3000 revolutions per minute; the second revolving speed range is greater than 3000 revolutions per minute and less than or equal to 3800 revolutions per minute; and the third revolving speed range is more than 3800 revolutions per minute.

2. The revolving speed variable voltage power supply according to claim 1, wherein the rectify device is further configured for that:
    when the control unit outputs the first control demand, the switch device is turned on, and the rectify device outputs a first voltage;
    when the control unit outputs the second control demand, the switch device is turned off, and the rectify device outputs a second voltage, the second voltage is less than the first voltage;
    when the control unit outputs the third control demand, the rectify device fails to output voltage.

3. The revolving speed variable voltage power supply according to claim 1, wherein a first voltage range comprises greater than 1.3V and less than or equal to 1.8V; and a second voltage range comprises greater than 0.8V and less than or equal to 1.3V.

4. The revolving speed variable voltage power supply according to claim 1, wherein the adjust device comprises:

a first output terminal connected to a control terminal of the switch device; and a second output terminal connected to an enable terminal of the rectify device;

wherein, when the revolving speed falls within the first revolving speed range, the first output terminal outputs the first control demand to the control terminal of the switch device, and the second output terminal outputs an enable signal to the enable terminal of the rectify device;

when the revolving speed falls within the second revolving speed range, the first output terminal outputs the second control demand to the control terminal of the switch device, and the second output terminal outputs an enable signal to the enable terminal of the rectify device;

when the revolving speed falls within the third revolving speed range, the first output terminal fails to output, and the second output terminal outputs the third control demand to an enable terminal of the switch device, such that the rectify device fails to work.

5. The revolving speed variable voltage power supply according to claim 4, wherein the adjust device includes a micro-controller unit, and the rectify device includes a rectifier chip.

6. A two-stroke gasoline engine system, comprising:
a two-stroke gasoline engine configured to power a model; and
a revolving speed variable voltage power supply for a glow plug of the two-stroke gasoline engine according to any one of claims 1, 2 and 3-5.

7. A four-stroke gasoline engine system, comprising:
a four-stroke gasoline engine configured to power a model; and
a revolving speed variable voltage power supply for a glow plug of the four-stroke gasoline engine according to any one of claims 1, 2 and 3-5.

* * * * *